United States Patent Office 3,151,706
Patented Oct. 6, 1964

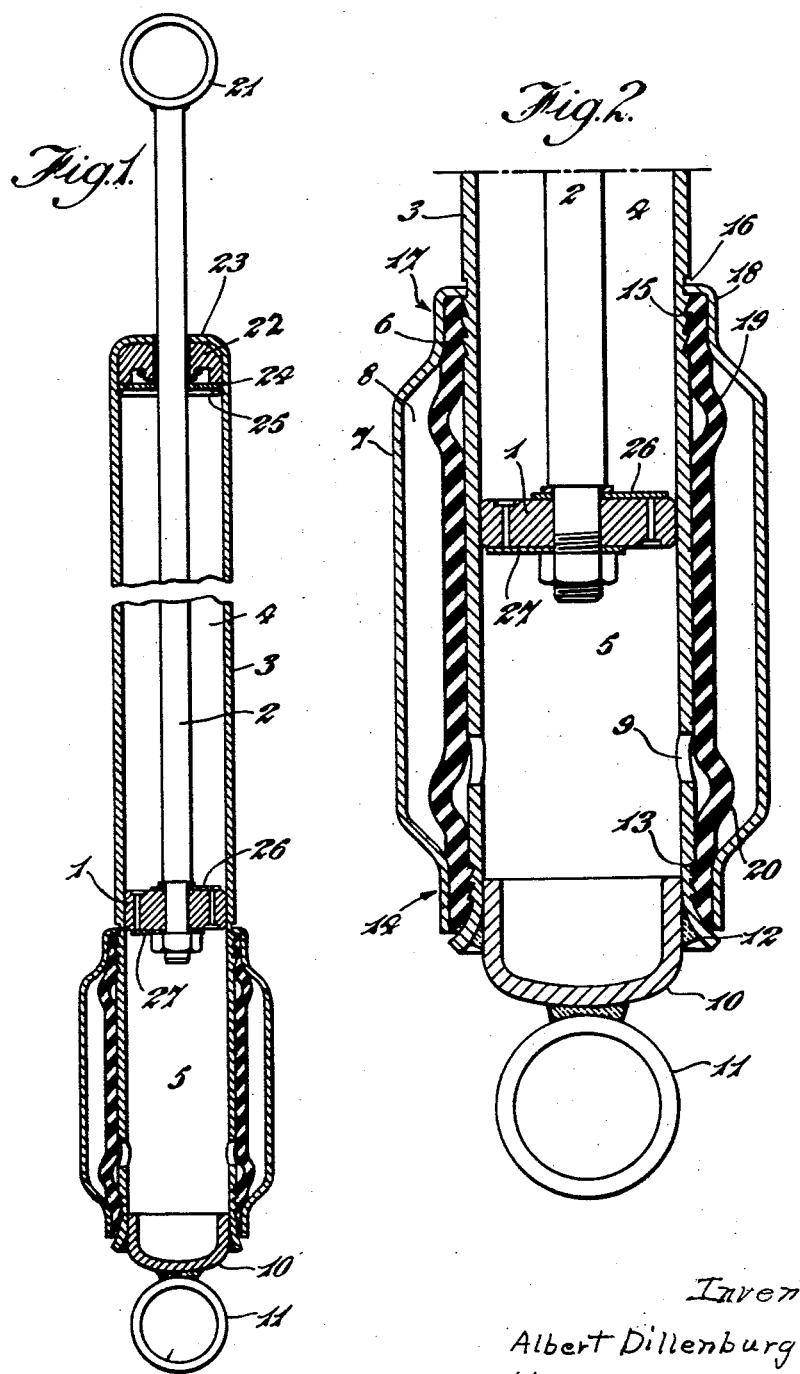

3,151,706
TELESCOPIC FLUID SHOCK ABSORBER HAVING GAS CUSHION MEANS
Albert Dillenburger, Koblenz-Lutzel, and Kurt Graef, Koblenz-Neuendorf, Germany, assignors to Stabilus Industrie- und Handelsgesellschaft m.b.H., Koblenz-Neuendorf, Germany
Filed Aug. 22, 1962, Ser. No. 218,774
Claims priority, application Germany Aug. 23, 1961
1 Claim. (Cl. 188—100)

The invention concerns a telescopic fluid shock absorber and is particularly applicable to shock absorbers for motor vehicles.

According to the invention, there is provided a telescopic fluid shock absorber comprising a working cylinder enclosing a fluid-filled working space, a piston slidably mounted in said cylinder, a resilient tubular sheath extending around said cylinder over at least part of the length of said cylinder, a flanged rigid casing covering said sheath and defining a gas cushion between said sheath and said casing, said cylinder having at least one aperture such that fluid therein is applied to the inner side of said sheath, and a flange on said cylinder against which one end of said sheath abuts, said cylinder having a peripheral groove beyond the other end of said sheath, in which groove the flanged casing engages and thereby axially secures said other end of said sheath, and sawtooth recesses into which the respective end portions of said sheath are pressed by said casing.

Since considerable pressure arises in the fluid when the shock absorber is operating, and is transferred through the resilient sheath to the gas cushion, the cushion must be sealed in an absolutely reliable manner even at the highest pressures if the shock absorber is to meet all requirements. Thus, in the present invention, the recesses in the surface of the working cylinder are of saw-tooth shape and the working cylinder is flanged or flared at one place where the resilient sheath is fixed, while at the other fixing place it is provided with an annular groove in which the flanged end of the rigid casing engages. The ends of the casing are drawn in at the places where the resilient sheath is fixed and press the ends of the sheath into the saw-tooth groove, thus producing a particularly intimate and leak-resistant connection. At one fixing place the casing bears against the flanging or flaring of the working cylinder, and at the other end its flanged rim is supported in the annular groove of the other fixing place.

According to a preferred feature of the invention, the tubular resilient sheath is longer than the casing enclosing it, so that it is buckled longitudinally. This has the advantage that the sheath gains a good bearing against the flange of the working cylinder in one fixing place and against the flanged edge of the casing at the other fixing place, and tolerance differences in the length of the sheath are equalised through the resultant wrinkles or folds. Loading of the ends of the sheath at the places where they are fixed is also lessened, since the sheath can easily curve in the folded portions and can easily yield to the pressure of the working fluid without being subjected to tensile stress at the fixing places. This decreases the danger of breakage at the fixing places and gives the tube a considerably longer life. And finally the fluid can pass from the working cylinder into the sheath, which is slackened by the folds, without an additional pressure, which feature encourages resilience and quick reaction in the operation of the shock absorber. The invention has the further advantage that an ordinary smooth commercial tube can be used for the resilient sheath.

A preferred embodiment of the invention will now be described with reference to the accompanying drawing in which:

FIG. 1 shows a longitudinal sectional view of the shock absorber;

FIG. 2 shows part of FIG. 1 in more detail.

The working piston 1, which is provided with conventional throttle valves 26 and 27 is attached to the end of the piston rod 2 and movably mounted in the damper working cylinder 3, the damper cylinder 3 being filled with a damping fluid such as oil and divided by the piston 1 into an upper working space 4 (high-pressure space) and a lower working space 5 (low-pressure space). The damping cylinder 3 is enclosed by a resilient tube or sheath 6, which is surrounded by a rigid casing 7, with which it forms an annular space 8 filled with a gas. The inside of the tube 6 is connected to the working space 5 by a plurality of apertures 9. The tube 6 is made of a highly-resilient, oil-resistant and temperature-resistant material, such as a polyamide known as "Vulkollan," and is pushed over the damping cylinder 3.

The flange 23 on the damper cylinder 3 retains the piston rod guiding and sealing means 22, which is supported by the O-ring 25 and the disc 24.

The lower end of the damping cylinder 3 is closed by a base 10, which is welded to the cylinder 3 and provided with the usual eyelet 11 for attaching it to the wheel-axles. The piston rod 2 is joined to the framework of the vehicle by means of an eyelet 21 at its upper end. The arrangement can also be reversed, the piston rod 2 being connected to the unsprung and the damping cylinder 3 to the sprung parts of the vehicle.

The lower end of the damping cylinder 3 is provided with a flange 12 which serves as a bearing surface for the lower end of the tube 6. Adjoining the flange 12, a plurality of saw-tooth grooves 13 are provided in the surface of the damping cylinder 3, into which grooves the end of the tube is pressed by the end 14 of the casing 7.

At the upper end of the tube 6 saw-tooth grooves 15 are also formed in the damping cylinder 3, adjoining which there is an annular groove 16. The casing 7 is drawn in onto the outer diameter of the tube 6 at 17, while its end 18 is flanged and engages in the annular groove 16. The tube 6 is longer than the casing 7 enclosing it, and when the flange 18 is applied to it, it becomes buckled, forming two wrinkles 19, 20, and pressed against the flange 12. Any fluid escaping from the working space through the apertures 9 collects in the wrinkles 19, 20.

The shock absorber operates as follows:

When the piston 1 descends, the upper working space 4 cannot accommodate the amount of fluid expelled from the space 5, owing to the volume of the piston rod 2. The surplus fluid passes through the openings 9 into the gap between the tube 6 and the outer surface of the damping cylinder 3, the tube 6 being expanded and the gas cushion in the annular space 8 compressed.

If the piston 1 is raised, the fluid passes from the high-pressure space 4 through the passages and valves in the piston 1 into the lower working space 5. As the high-pressure space 4 does not provide as much fluid as the working space 5 can accommodate, owing to the volume of the piston rod 2, the resilient tube 6 is pressed radially inwardly by the excess pressure of the gas cushion in the space 8 and conveys part of the fluid which it encloses through the openings 6 into the space 5. This equalising action of the resilient tube 6 is aided by the wrinkles 19, 20 which it has formed, since the tube is slack in the wrinkles. The places where the tube 8 is fixed are also considerably relieved of stress.

In spite of the smoothness of the ends of the tube, the design and arrangement of the tube taught by the invention produces mechanically reliable and also substantially fluid-tight fastening to the damping cylinder. The tension component arising when the tube expands is taken up by the saw-tooth grooves 13, 15, while the flanged end 18 of the casing 7 and the flange 12 of the damping cylinder 3 take up the pressure component which occurs when the damper is blocked, i.e. when the blocking temperature is reached. Particularly important is the fact that the flow of material occurring in the tube 6 at the places where it is fixed owing to radial compression of the housing case 7 is spread between the fixing places through the flanged end 18 on the one hand and the flange 12 on the other hand, causing the tube to wrinkle in its vicinity and there gain great flexibility under a very slight load. The resultant improvement in the flow of the damping fluid into the casing is an advantage particularly at low temperatures and enables the shock absorber to operate satisfactorily even at temperatures of —20° C. and below.

We claim:

A telescopic fluid shock absorber comprising a working cylinder member forming a fluid filled working space, a resilient tubular sheath member mounted around the periphery of said cylinder member, said sheath having a middle portion of substantial length positioned in contact with the outer surface of said cylindrical member, a flanged rigid cylindrical casing mounted around the outer periphery of said resilient sheath member and forming a sealed gas cushion spaced therearound, aperture means in said cylinder member disposed adjacent said sheath member for passing fluid therethrough against the inner side of said sheath member, an outwardly flared peripheral flange on said cylinder member, a plurality of circumferentially extending saw teeth on the outer periphery of said cylinder member adjacent said flared flange, one end of said sheath member being secured between said cylindrical casing and said saw teeth and flared flang, circumferential recess means in said cylinder member spaced from said saw teeth, an annular inwardly extending flange on said casing extending into said circumferential recess means, other saw teeth on the outer periphery of said cylinder member adjacent said circumferential recess means, the other end of said sheath member being secured between said other saw teeth and the other end of said casing, said sheath having a middle portion of substantial length positioned in contact with the outer surface of said cylindrical member, wherein said sheath member has a uniform wall thickness and has an overall longitudinal length greater than that of said casing so that said sheath is buckled and forms folds therein.

References Cited in the file of this patent

UNITED STATES PATENTS

| 689,386 | Burger | Dec. 24, 1901 |
| 713,691 | Schneider et al. | Nov. 18, 1902 |
| 2,628,692 | Hufferd | Feb. 17, 1953 |
| 2,741,205 | Paulton | Apr. 10, 1956 |
| 2,856,035 | Rohacs | Oct. 14, 1958 |
| 3,043,338 | Hanson | July 10, 1962 |

FOREIGN PATENTS

| 1,006,276 | Germany | Apr. 11, 1957 |
| 1,059,101 | France | Nov. 10, 1953 |
| 1,076,192 | France | Apr. 21, 1954 |